United States Patent [19]
Mitsuhashi

[11] Patent Number: 5,138,509
[45] Date of Patent: Aug. 11, 1992

[54] NEGATIVE PRESSURE CONTROL MEMBER FOR STABILIZING MAGNETIC DISK CONTACT WITH A MAGNETIC HEAD

[75] Inventor: Daisuke Mitsuhashi, Tokyo, Japan
[73] Assignee: Fuji Photo Film Co., Ltd., Kanagawa, Japan
[21] Appl. No.: 754,271
[22] Filed: Aug. 30, 1991

Related U.S. Application Data
[63] Continuation of Ser. No. 479,807, Feb. 13, 1990, abandoned.

[30] Foreign Application Priority Data
Mar. 14, 1989 [JP] Japan .................................. 1-59661
Jun. 12, 1989 [JP] Japan .................................. 1-146710

[51] Int. Cl.$^5$ ............................................ G11B 15/60
[52] U.S. Cl. ................................ 360/130.34; 360/129
[58] Field of Search ............... 360/130.1, 130.2, 130.3, 360/130.34, 104, 71, 129

[56] References Cited
U.S. PATENT DOCUMENTS
| | | | |
|---|---|---|---|
| 4,794,482 | 12/1988 | Horio et al. | 360/130.34 X |
| 4,814,922 | 3/1989 | Osanai | 360/130.34 X |
| 4,833,556 | 5/1989 | Kasarko et al. | 360/130.34 X |

Primary Examiner—Andrew L. Sniezek
Attorney, Agent, or Firm—Sughrue, Mion, Zinn Macpeak & Seas

[57] ABSTRACT

A magnetic disk control member having a flat opposing surface opposing a rotating magnetic disk that defines a free rotary surface plane and provided protrudingly with a magnetic head, a protrusion for generating a negative pressure disposed at the upstream side with respect to the rotational direction of the magnetic disk, and an inclined surface disposed at an end of the opposing surface at the downstream side with respect to the rotational direction of the magnetic disk and inclined so as to gradually become closer to the free rotary surface plane towards the downstream side with respect to the rotational direction of the magnetic disk. With the magnetic disk control member, the magnetic disk is curved by the negative pressure generated at the downstream side of the protrusion to come in sliding contact with the magnetic head, and gently pushed back by the inclined surface to the free rotary surface plane side to be straightened, thereby eliminating flapping vibrations due to excessive deformation of the magnetic disk and achieving a stable and good head contact while suppressing deformation of the magnetic disk to a minimum.

7 Claims, 4 Drawing Sheets

NEGATIVE PRESSURE CONTROL MEMBER FOR STABILIZING MAGNETIC DISK CONTACT WITH A MAGNETIC HEAD

This is a continuation of application Ser. No. 07/479,807 filed Feb. 13, 1990 abandoned.

BACKGROUND OF THE INVENTION

This invention relates to a stabilizing plate, used in a magnetic disk recording and reproduction device for recording and reproduction with a flexible magnetic disk, to maintain a good contact of a magnetic head against the magnetic disk.

In a recording and reproduction device which uses a thin, flexible magnetic disk as a recording medium, when the magnetic head is simply caused to come in contact against the magnetic disk, the magnetic disk tends to be deformed by the pressure of the magnetic head and to come away from the magnetic head, and a stable contact is not obtained.

Heretofore, there has been an attempt in which a magnetic disk control member (hereinafter simply referred to as "control member") is provided in the vicinity of the magnetic head to generate a negative pressure between the control member and the magnetic disk. The negative pressure attracts the magnetic disk towards the magnetic head side and the magnetic disk is pressed against the magnetic head to obtain a stable head contact.

Referring to FIG. 7, control members 13 are disposed at the upstream side and the downstream side of a magnetic head 11 with respect to the rotational direction (arrow R) of a magnetic disk 12. The surfaces of the control members opposing the magnetic disk 12 are formed to be inclined so that the surfaces become more distant from a free rotary surface plane N of the magnetic disk 12 towards the downstream side with respect to the rotational direction of the magnetic disk. Thus, as the magnetic disk 12 rotates at a high speed, a negative pressure is generated between the inclined surfaces and the magnetic disk.

In this specification, the term "free rotary surface plane" is defined as a rotary surface plane of a magnetic disk attached to a spindle motor of the magnetic disk recording and reproduction device, rotating with no action of external forces.

However, since, in the prior art control members 13, the surfaces opposing the magnetic disk 12 become more distant from the free rotary surface plane N of the magnetic disk 12 towards the downstream side with respect to the rotational direction of the magnetic disk, when the magnetic disk 12 is deflected along the control members 13, the amount of deflection (indicated by l in FIG. 7) tends to become excessive at the downstream side. As a result, the surface of the magnetic disk 12 tends to vibrate to a great extent in association with the high-speed rotation of the magnetic disk 12, which can deteriorate stable sliding contact with the magnetic head 11.

Furthermore, since the deflection of the magnetic disk 12 is asymmetric with respect to the magnetic head 11 between the upstream side and the downstream side, the front end of the magnetic head 11 must be inclined by 2°-4° towards the upstream side with respect to the rotational direction of the magnetic disk in order to obtain a sufficient head contact. Setting of the inclination of the magnetic head 11 requires a very complicated procedure.

When the magnetic disk 12 begins to rotate, the magnetic disk is normally located on its free rotary surface plane N with a large spacing between the magnetic disk 12 and the control members 13, and the control members 13 are required to generate a negative pressure sufficient to attract the magnetic disk 12. On the other hand, during the steady-state rotation of the magnetic disk 12 after it is attracted towards the control member 13 side, the amount of negative pressure is not required to be as large as that required when the magnetic disk 12 is first started. However, with the prior art control members 13, when the magnetic disk 12 is attracted and the distance between the magnetic disk 12 and the control members 13 becomes small, a greater amount of negative pressure is generated on the inclined surfaces which, conjointly with the above-described excessive deformation of the magnetic disk 12, results in an increase in the rotational driving torque of the magnetic disk 12.

OBJECT OF THE INVENTION

With a view to eliminate the above prior art problems of magnetic disk control members, it is a primary object of the present invention to provide a magnetic disk control member which generates an appropriate and sufficient negative pressure between the magnetic disk and the magnetic head, thereby suppressing the deformation of the magnetic disk to a minimum and achieving a good head contact.

SUMMARY OF THE INVENTION

In accordance with the present invention which attains the above object, there is provided a magnetic disk control member which operates in a magnetic recording and reproduction device that causes a rotary flexible magnetic disk to come in sliding contact against a magnetic head. The control member guides the magnetic disk towards the magnetic head by a negative pressure. The control member comprises an opposing surface opposing the magnetic disk and formed in a surface nearly parallel to a free rotary surface plane of the magnetic disk. A protrusion is disposed at an end of the opposing surface at the upstream side with respect to the rotational direction of the magnetic disk and formed nearly along the radial direction of the magnetic disk. There is an opening formed nearly at the center of the opposing surface. Within the opening is the magnetic head. Finally, an inclined surface is disposed at an end of the opposing surface at the downstream side with respect to the rotational direction of the magnetic disk and is formed so as to become closer to the free rotary surface plane towards the downstream side with respect to the rotational direction of the magnetic disk.

In association with high-speed rotation of the magnetic disk, a negative pressure is generated between the portion of the magnetic disk located at the downstream side with respect to the rotational direction of the magnetic disk of the protrusion formed on the magnetic disk control member and the flat opposing surface formed opposing the magnetic disk. The negative pressure attracts the magnetic disk towards the magnetic head to achieve a sliding contact. The magnetic disk follows the flat opposing surface and is held stable.

Furthermore, the attracted magnetic disk is gradually pushed back to the free rotary surface plane side along the inclined surface formed at the downstream side of the opposing surface towards the downstream side with respect to the rotational direction of the magnetic disk. As a result, the amount of deformation of the magnetic disk is suppressed to a minimum and flapping vibration of the magnetic disk is prevented, thereby achieving a good head contact.

DESCRIPTION OF THE PREFERRED EMBODIMENTS

A preferred embodiment of the inventive magnetic disk control member will now be described in detail with reference to the drawings.

Figure 1:
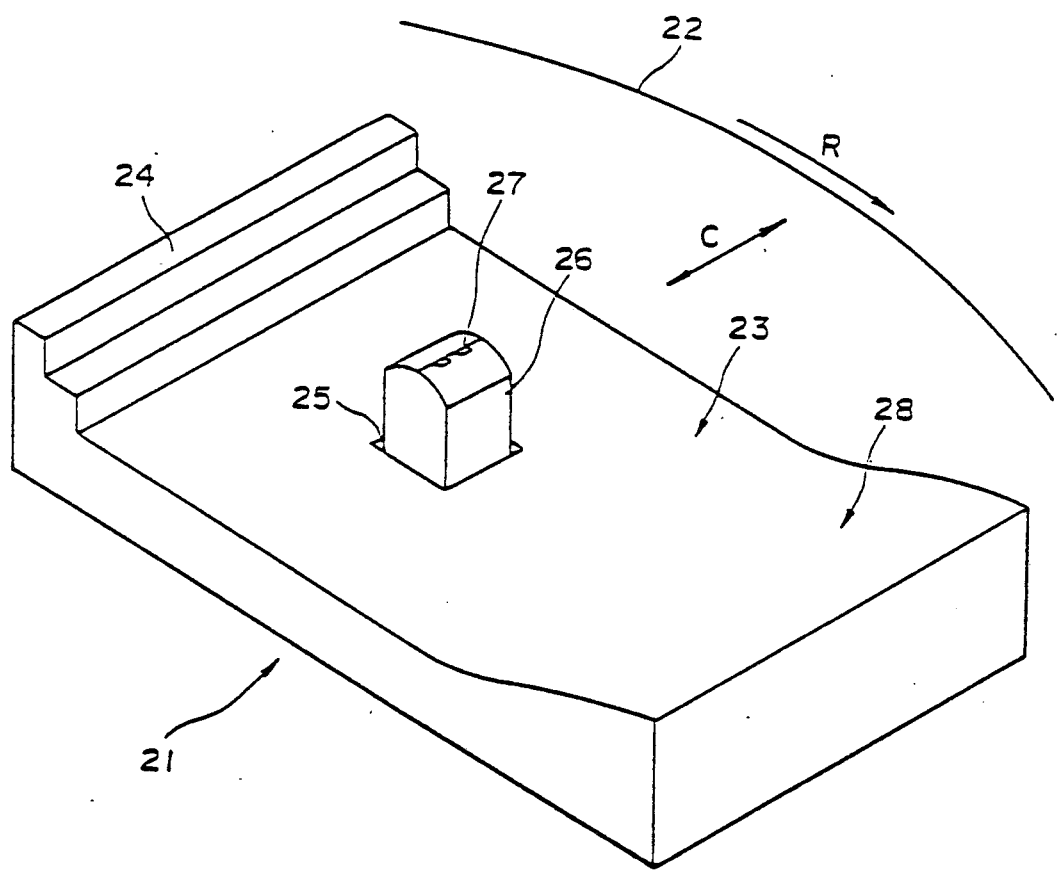
FIG. 1 is a schematic perspective view showing an embodiment of the inventive magnetic disk control member.

As shown in FIG. 1, a magnetic disk control member 21 (hereinafter simply referred to as "control member 21") has a nearly rectangular form. On the control member 21 is formed an opposing surface 23 opposing a magnetic disk 22 and almost parallel to a free rotary surface plane N of the magnetic disk 22. At an end of the opposing surface 23, located at the upstream side with respect to the rotational direction (arrow R) of the magnetic disk, is provided a step-formed (two steps in this embodiment) protrusion 24 protruding towards the magnetic disk 22 side and formed nearly along the radial direction (arrow C) of the of the magnetic disk 22. Thus, as the magnetic disk 22 rotates, a negative pressure is generated in the downstream area of the protrusion 24.

Nearly at the center of opposing surface 23 is provided an opening 25 vertically penetrating the control member 21. In the opening 25 is inserted a magnetic head 26 which comes in sliding contact with the magnetic disk to make magnetic recording and reproduction, with its front end protruded upward from the opposing surface 23, at which a gap 27 is formed.

At an end of the opposing surface 23 at the downstream side with respect to the rotational direction of the magnetic disk, a curved inclined surface 28 is formed. The surface gradually becomes closer to the free rotary surface plane N of the magnetic disk 22 towards the downstream side with respect to the rotational direction of the magnetic disk 22. This surface contour acts to revert the magnetic disk 22 attracted and deformed by the negative pressure generated at the downstream side of the protrusion 24 smoothly back to the free rotary surface plane N.

Figure 2:
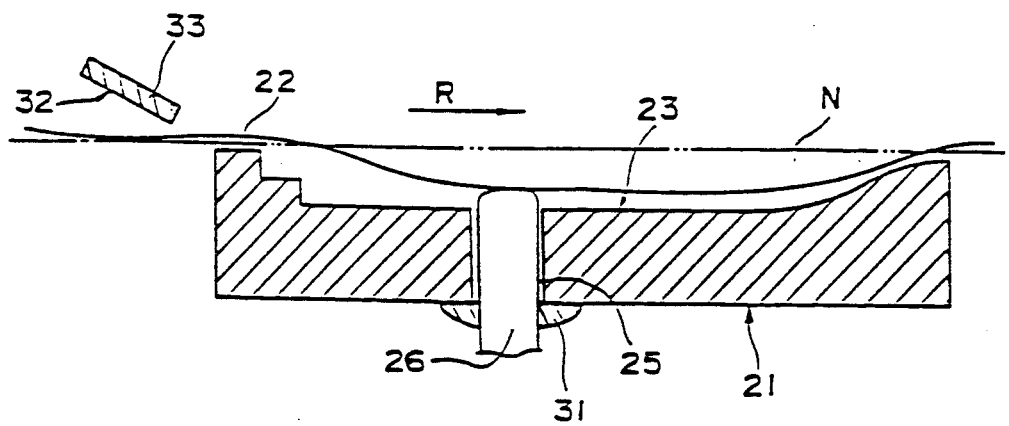
FIG. 2 and FIG. 3 are schematic cross sectional views of the embodiment.
Figure 3:
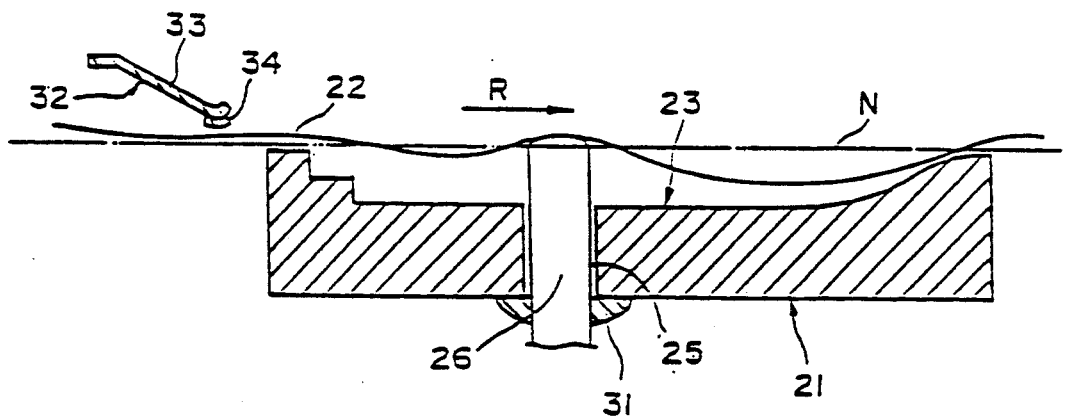

FIG. 2 and FIG. 3 show cross sectional views taken along the rotational direction of the magnetic disk of the above-described control member 21. In this embodiment, the inclined surface 28 and the protrusion 24 are formed so that the distances from the downstream end of the inclined surface 28 and the front end of the protrusion 24 to the free rotary surface plane N are almost equal. As a result, although the magnetic disk 22 is attracted by the control member 21 and curved, it is positioned in the same plane almost parallel to the free rotary surface plane N at the upstream and downstream ends of the control member 21.

The front end of the magnetic head 26 may be positioned below the free rotary surface plane N of the magnetic disk 22 or slightly protruding upward. Furthermore, to prevent the negative pressure generated between the magnetic disk 22 and the control member 21 in association with the rotation of the magnetic disk from escaping through the opening 25 of the control member 21, the gap between the opening 25 and the control member 21 is air-tightly sealed with a sealing material made of a synthetic resin or the like at the lower surface of the control member 21.

As shown in FIG. 2, above the magnetic disk 22 at the upstream side of the control member 21 is disposed a positive pressure generating auxiliary plate 33, which is provided with an inclined surface 32, formed on the surface opposing the magnetic disk 22 and inclined to become gradually closer to the free rotary surface plane N towards the rotational direction of the magnetic disk 22. As the magnetic disk 22 rotates, a positive pressure is generated between the auxiliary plate 33 and the magnetic disk 22, which functions to push the magnetic disk 22 towards the magnetic head 26 side.

In an example shown in FIG. 3, the auxiliary plate 33 is made of a plate spring, and on the surface opposing the magnetic disk 22 is formed the inclined surface 32 described above with reference to FIG. 2. Therefore, in association with rotation of the magnetic disk 22, a positive pressure is generated between the magnetic disk 22 and the inclined surface 32 to push the magnetic disk 22 towards the magnetic head 26 side, and the magnetic disk 22 can also be urged to the magnetic head 26 side by the spring force of the plate spring. For this purpose, the front end of the plate spring is provided with a pad 34 to prevent the magnetic disk 22 from being scratched when the magnetic disk 22 comes in contact with the plate spring. However, the auxiliary plate 33 is not necessarily required.

Thus, as the magnetic disk 22 rotates at a high speed, a negative pressure is generated between the magnetic disk 22 located at the downstream side with respect to the rotational direction of the magnetic disk of the protrusion 24 protruding from the control member 21 and the opposing surface 23 formed opposing the magnetic disk 22, to attract the magnetic disk 22 towards the magnetic head 26 protruding at the opposing surface 23 for sliding contact, and the magnetic disk 22 is stably held to follow the flat opposing surface. The thus attracted magnetic disk 22, as it moves towards the downstream side with respect to the rotational direction of the magnetic disk along the gently sloped inclined surface 28 formed at the downstream end of the opposing surface 23, is gradually pushed back to the free rotary surface plane N so that deformation of the magnetic disk 22 is smoothened without exerting an excessive force and the deformation is suppressed to a minimum.

Figure 4:
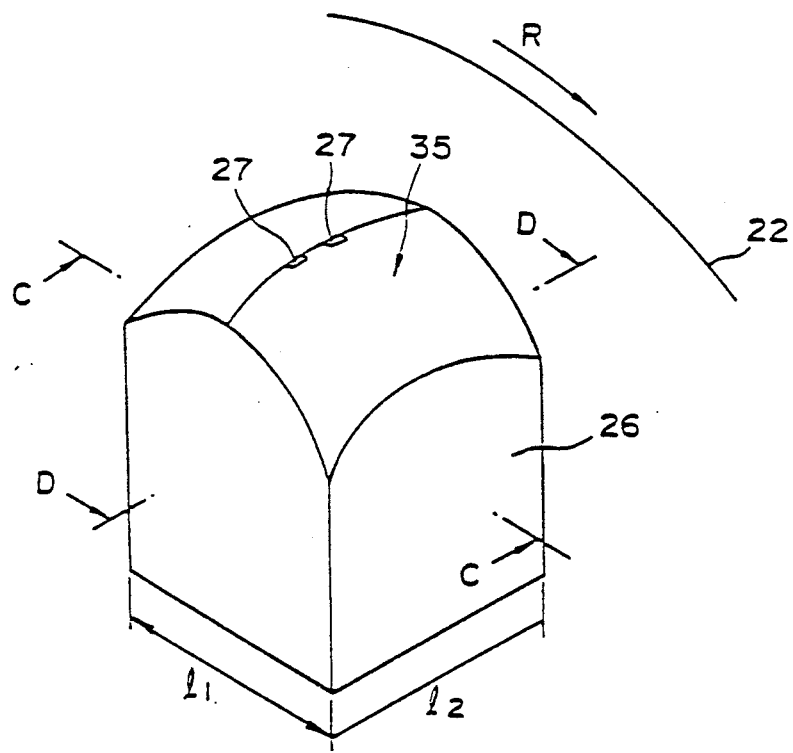
FIG. 4 is a schematic perspective view of the front end of a magnetic head.
Figure 5:
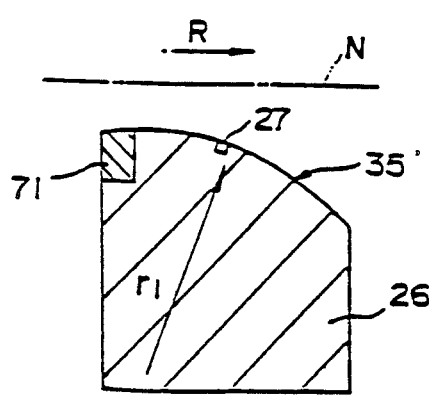
FIG. 5 and FIG. 6 are respectively schematic cross sectional views taken along lines C—C and D—D in FIG. 4.

FIG. 4 shows an example of the magnetic head 26 used in this embodiment, and FIG. 5 shows a cross sectional view of the magnetic head 26 taken along line C—C in FIG. 4, that is, along the rotational direction (arrow R) of the magnetic disk 22. In these two Figures, the opposing surface 35 of the magnetic head 26 opposing the magnetic disk 22 is inclined, for example, with a curvature radius of $r_1$ so as to become more distant from the free rotary surface plane N of the magnetic disk 22 towards the rotational direction of the magnetic disk 22.

Furthermore, an upstream side end 71 of the magnetic head 26 may be made of a high-hardness material such as sapphire to prevent abrasion due to contact with the magnetic disk 22.

Figure 6:
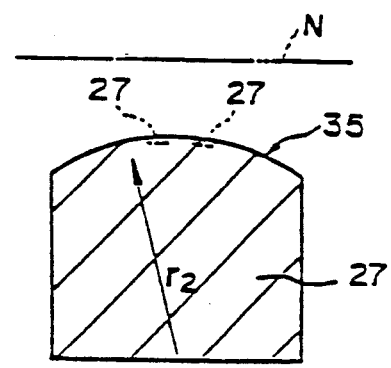
Figure 7:
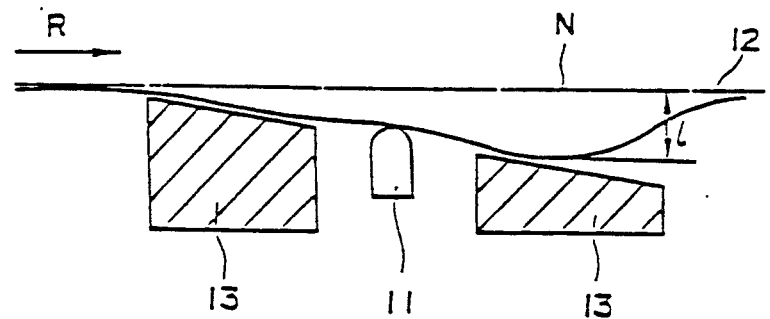
FIG. 7 is a schematic cross sectional view of a prior art magnetic disk control member.

FIG. 6 shows a cross sectional view of the magnetic head 26 taken along line D—D in FIG. 4, that is, along the radial direction of the magnetic disk 22. Then, the opposing surface 35 of the magnetic head 26 is inclined, for example, with a curvature radius of $r_2$ so that a gap 27 is at the top in the cross sectional view taken along the radial direction of the magnetic disk 22.

Therefore, the opposing surface 35 of the magnetic head 26 is a nearly spherical curved surface with the gap 27 at the top and, when $r_1$ and $r_2$ are set almost equal to each other, the curvature radii may be, for example, 50 to 150 mm. However, $r_1$ and $r_2$ may be different, for example, so that the cross sectional end of the magnetic head 26 taken along the radial direction of the magnetic disk 22 may be formed straight, that is, $r_2 = \infty$. In short, a further control portion, which generates a negative pressure between the magnetic disk and the control portion in association with high-speed rotation of the magnetic disk 22 to attract the magnetic disk 22, may be formed on the opposing surface 35 of the magnetic head 26 opposing the magnetic disk 22. Alternatively, such a control portion may be omitted. Furthermore, a groove may be formed in the opposing surface 35 along the rotational direction of the magnetic disk 22 to regulate the air flow and promote the generation of negative pressure.

The magnetic head 26 thus provided with the negative pressure generating control portions may have such dimensions as shown in FIG. 4 in which $l_1$ is at least about 1.2 mm and $l_2$ is at least about 1.2 mm, where $l_1$ is the length of a side along the rotational direction of the magnetic disk 22 and $l_2$ is the length of a side perpendicular to the rotational direction.

In this embodiment the control member 21 is nearly rectangular in shape. Alternatively, however, any other shape which has the opposing surface 35 parallel to the free rotary surface plane N of the magnetic disk 22 may be used. The protrusion 24 is not necessary to have a stepped form as seen in this embodiment, but may be protruded towards the magnetic disk 22 side and formed along nearly the radial direction of the magnetic disk. The inclined surface 28 may alternatively be a straight inclined surface, rather than a curved surface as used in this embodiment. To be short, the inclined surface may be formed so as to become gradually closer to the free rotary surface plane of the magnetic disk towards the downstream side with respect to the rotational direction of the magnetic disk.

What is claimed is:

1. A magnetic disk control member used in a magnetic recording and reproduction device which causes a rotary flexible magnetic disk to rotate in a free rotary surface plane and to come in sliding contact against a magnetic head, the free rotary surface plane being defined as a rotary surface plane of said magnetic disk rotating with no additional external forces acting thereon, said control member guiding said magnetic disk towards said magnetic head by a negative pressure, said control member comprising:

an opposing surface located adjacent to and opposing said magnetic disk on a same side as said magnetic head and having a substantial portion of said opposing surface substantially parallel to the free rotary surface plane of said magnetic disk, a protrusion disposed at an end of said opposing surface at an upstream side with respect to a rotational direction of said magnetic disk and formed substantially along a radial direction of said magnetic disk, an opening formed substantially at a center of said opposing surface and dimensioned to receive said magnetic head, and an inclined surface disposed at an end of said opposing surface at a downstream side with respect to the rotational direction of said magnetic disk, said inclined surface being inclined with respect to said opposing surface so as to gradually become closer to said free rotary surface plane in a direction towards the downstream side with respect to the rotational direction of said magnetic disk, wherein said magnetic disk is deformed by a negative pressure generated at a location between said protrusion and said inclined surface for guiding said magnetic disk towards said magnetic head by a negative pressure, and wherein said inclined surface is contoured to return said magnetic disk to a position proximate to said free rotary surface plane, to attendantly suppress deformation of said magnetic disk and thereby prevent flapping vibration of said magnetic disk.

2. The magnetic disk control member of claim 1 wherein said inclined surface is contoured to return said magnetic disk to a position coincident with said free rotary surface plane.

3. The magnetic disk control member of claim 1 wherein said magnetic head is shaped so as to become more distant from the free rotary surface plane in a direction towards the rotational direction of said magnetic disk and provide a negative pressure.

4. The magnetic disk control member of claim 1 wherein said opening and said magnetic head has a gap therebetween and said gap is sealed to prevent leakage of negative pressure.

5. The magnetic disk control member of claim 1 further comprising in combination therewith a positive pressure control member being disposed at said upstream side of said control member with respect to the rotational direction of the magnetic disk and being located on a side of said magnetic disk opposite to said magnetic head.

6. The magnetic disk control member of claim 1, wherein a distance from said protrusion to said free rotary surface plane is approximately equal to a distance from said inclined surface at its most downstream end to said free rotary surface plane.

7. The magnetic disk control member of claim 1 wherein said protrusion is step-shaped and formed in the radial direction.

* * * * *